Figure 1:
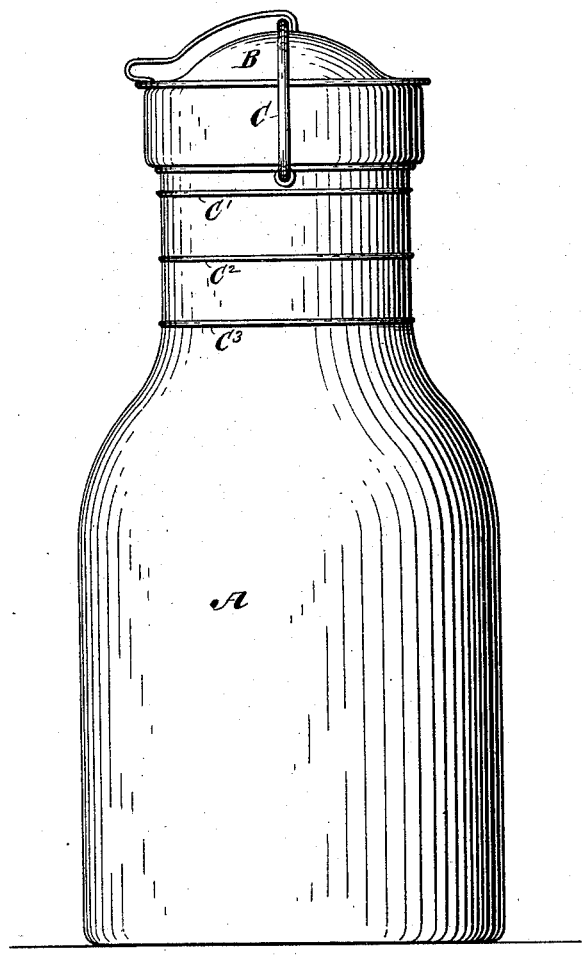

(No Model.)

A. V. WHITEMAN.
MILK JAR.

No. 421,461. Patented Feb. 18, 1890.

Witnesses
S. V. Edmonds.
Fred Kneifer

Inventor
Abram V. Whiteman
By his Attorneys
Gifford & Brown

UNITED STATES PATENT OFFICE.

ABRAM V. WHITEMAN, OF PORT CHESTER, NEW YORK.

MILK-JAR.

SPECIFICATION forming part of Letters Patent No. 421,461, dated February 18, 1890.

Application filed October 31, 1888. Serial No. 289,608. (No model.)

*To all whom it may concern:*

Be it known that I, ABRAM V. WHITEMAN, of Port Chester, in the county of Westchester and State of New York, have invented a certain new and useful Improvement in Milk-Jars, of which the following is a specification.

My improvement consists in a glass milk-jar capable of containing milk for transportation and having a cover and bearing at certain intervals a number of marks by reference to which the purity of the milk contained within it may be determined.

In the accompanying drawing the figure is a side view of a glass milk-jar embodying my improvement.

A designates the milk-jar. It may be of any desirable shape. It is to be made of glass and transparent, so that the contents may be seen from the exterior. It is provided with a cover B, which may be made of metal or of any other suitable material. It is shown as having a sliding connection with a swinging bail C, so that it may be readily removed and reapplied. The bail may be secured by a wire post under the shouldered mouth portion of the jar.

$C'$ $C^2$ $C^3$ designate three marks or lines extending around the neck portion of the jar. They may be formed by blowing them into the jar, or they may be formed in any other suitable manner. They serve as a means for determining the quality of the milk contained in the jar, because if the cream upon the top of the milk descends as low as the top mark $C'$ the milk will be of poor quality. If it descends as low as the middle mark $C^2$, then the milk will be of medium quality, and if it descends as low as the lowest mark $C^3$ then the milk will be of superior quality. There may be any words or symbols indicative of the purity of the milk marked in any suitable manner upon the exterior of the jar adjacent to these lines.

My improvement is a very important one, as it puts into the hands of the consumer a milk-jar which will enable the purchaser to determine at a glance the quality of the milk delivered to him.

The purchaser of the milk is not obliged to submit the milk to any tests or to perform any operation with respect to it. He has not even to pour it into any tester or to introduce any tester into the milk. It will only be necessary for him to allow the jar to stand, and when the cream shall have separated from the milk the jar itself will indicate to him the quality of the milk.

It is obvious that the milk within the jar must, when first placed therein, extend into a space above the upper mark $C'$, and also that the neck of the jar having the marks thereon must bear such proportion to the body of the jar as to correctly indicate the quality of the milk by the thickness of the cream.

What I claim as my invention, and desire to secure by Letters Patent, is—

As a new article of manufacture, a transparent milk-jar having a cover and provided with graduation marks or lines upon its surface, located with reference to the capacity and internal form of the jar, to indicate the line of separation between the cream and the milk as it should occur in milk of standard quality, and deviations therefrom, substantially as specified.

ABRAM V. WHITEMAN.

Witnesses:
C. R. FERGUSON,
WILLIAM H. ROBINSON.